Sept. 30, 1947.    P. F. SHARP ET AL    2,428,045
LIQUID TREATING APPARATUS
Original Filed April 9, 1942
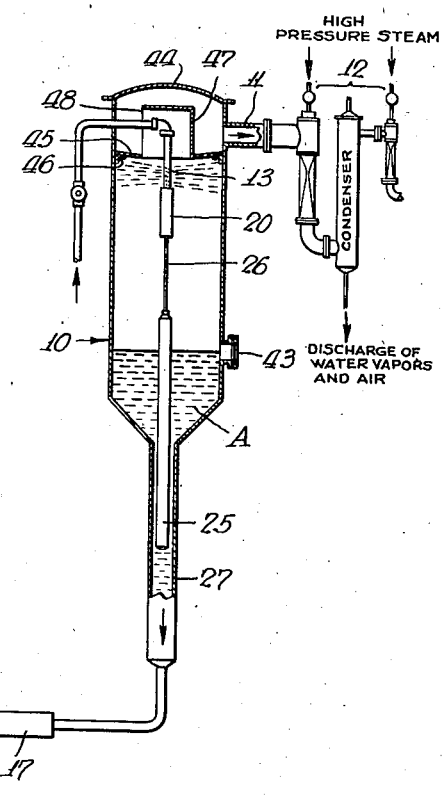
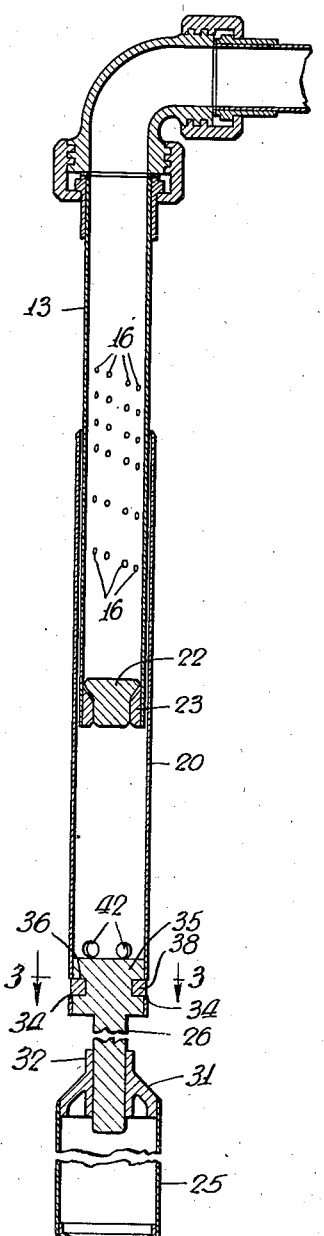
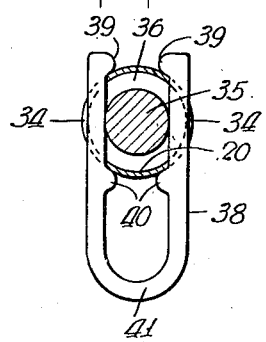
INVENTORS
PAUL F. SHARP
DAVID B. HAND
EDWARD S. GUTHRIE
BY
Dean Fairbank & Hirsch
ATTORNEYS Patented Sept. 30, 1947

2,428,045

UNITED STATES PATENT OFFICE 2,428,045

LIQUID TREATING APPARATUS

Paul F. Sharp, David B. Hand, and Edward S. Guthrie, Ithaca, N. Y., assignors to Cornell Research Foundation, Inc., Ithaca, N. Y., a corporation of New York Original application April 9, 1942, Serial No. 438,216. Divided and this application April 21, 1942, Serial No. 439,836

8 Claims. (Cl. 183—2.5)

1

This application is a division of copending application Serial No. 438,216, filed April 9, 1942, and relates to liquid treating apparatus including a chamber such as that employed to vary the gas content of a liquid, separate the air from a liquid, or extract the more volatile parts of a liquid from those less volatile. Such a chamber for instance, may be of the type employed to deaerate liquid foods such as milk, fruit juices, tomato juice and the like for the purpose of preserving certain desirable qualities therein. It may be used also for maintaining a constant level of any liquid in a chamber into which the liquid is being delivered and from which it is being withdrawn at a constant rate, and the gas content of the liquid being delivered to the chamber may be varied by spraying the liquid and by delivering gas to the chamber under pressure or by withdrawing it under partial vacuum.

One object of the present invention is to provide a new and improved means for controlling the rate of flow of liquid into a chamber of the general type referred to.

Another object is to provide a new and improved valve and valve operating mechanism which is actuated to maintain a substantially constant amount of liquid in a chamber into which the liquid is sprayed, and which is not subject to erratic fluctuations due to the formation or collection of foam on the top surface of said liquid.

Another object is to provide a comparatively simple float valve which can be easily and expeditiously disassembled to render its parts easily accessible for cleaning in accordance with the strictest sanitary requirements of the liquid food industry.

Various other objects, features and advantages of the invention will be apparent from the following description, and from an inspection of the accompanying drawings showing one form of apparatus embodying the invention, in which Fig. 1 is a side elevation somewhat schematic and partly in section of a part of a system for processing a liquid, and including a deaerator having a float controlled valve embodying the present invention;

Fig. 2 is a vertical section of the float valve employed to control the flow of liquid into the deaerator; and Fig. 3 is a section taken on line 3—3 of Fig. 2, but on a slightly larger scale.

Referring to Fig. 1 of the drawings, there is shown as an example a chamber 10 of the type which can be used to remove air from liquid food

2 and especially milk, so that the loss of vitamin C and the development of oxidized flavor in the milk are prevented or retarded. The chamber 10 is maintained under vacuum high enough to flash boil some of the water of the milk at the temperature at which this milk is introduced into said chamber. This flash boiling operation sweeps or washes out the air from the milk, so that the milk A collected at the bottom of the chamber 10 is substantially free of oxygen gas.

The necessary degree of vacuum in the deaerator chamber 10 may be produced by any suitable means. For that purpose, the upper end of the chamber is shown as having a connection 11 for the exhaust of gases and vapors and leading to a suitable evacuator 12 for maintaining a reduced pressure in the chamber and which is shown as an example of the steam jet type. Any other type of vacuum creating means may be employed. The water vapors drawn out through this evacuator connection 11 carry or sweep out the air released from the milk by the flash boiling described, and leave the milk in the bottom of the chamber sufficiently deaerated to effectively preserve the desirable qualities of the milk.

The milk is introduced into the top of the deaerator chamber 10 through an intake pipe 13, and is formed with a series of circumferentially arranged holes 16 so that the milk is sprayed from said pipe laterally in all directions toward or against the sides of the deaerator chamber 10, runs down along the sides of said chamber and is collected at the bottom. Due to the finely divided state of the milk in the spray and the thin film of milk on the walls of the deaerator chamber 10, there is secured very efficient and rapid flash boiling resulting in rapid and complete removal of the air from the milk.

The deaerated milk A is drawn off from the deaerator chamber 10 through a suitable check valve 17 by means of a constant speed pump 18 which delivers the milk for further processing as for instance through a series of pasteurizing, cooling or other units and to a bottling station or other packaging or storage point.

The spray holes 16 are desirably helically arranged on the intake pipe 13 and are flared outwardly to increase the spray action and to render these holes visible and readily accessible for cleaning and brushing, and may be about $\tfrac{1}{16}$ inch in diameter at their narrowest inner ends. The flow through these holes 16 is controlled by means of a sleeve 20 slidable over the intake pipe 13, and serving as a throttling device to block off or expose these holes successively in the helically arranged row according to the vertical position of said sleeve. It is desirable to effect control over only a comparatively few spray holes 16, while leaving the bulk of the spray holes always open during normal deaerating operations. For that purpose, the holes 16 are desirably arranged so that more of them are provided per unit of length in the upper perforated section of the intake pipe 13 than in its controlled lower section. In the specific form shown, the upper perforated section of the intake pipe 13 is provided with a double helical row of spray holes 16, while the lower controlled section has a single row.

The bottom of the intake spray pipe 13 is closed in a manner to permit it to be easily cleared for cleaning purposes. For that purpose, a plug 22 is dropped onto an annular seat 23 secured by welding in the inside of the pipe 13, and is retained on said seat merely by the action of gravity. The fluid pressure in the spray pipe 13 acting downwardly on the plug 22 will cause said plug to be retained in seated position during operations.

The sleeve 20 telescoped over the spray intake pipe 13 is desirably chamfered or bevelled at its upper end to form a comparatively sharp rim edge by which the holes 16 may be successively blocked and the flow therethrough throttled as the level of the milk A in the deaerator chamber 10 rises. This sleeve 20 has a slight clearance with respect to the spray pipe 13 to afford a free slide fit with said pipe. This clearance depends on the accuracy with which the parts are made and the extent of their resistance to denting during cleaning and handling. In actual practice, a clearance equivalent to a difference of $\frac{1}{32}$ of an inch between the internal diameter of the sleeve 20 and external diameter of the spray pipe 13 has been found sufficient.

The vertical position of the sleeve 20 is controlled from the level of the milk A by a float or bob 25 supporting said sleeve through a connecting rod 26. Proper control of this milk level is important. If this level is too low, air bubbles or foam might pass out with the milk removed from the deaerator chamber 10, and if it is too high, the tendency towards churning is increased.

Another problem in connection with a float controlled valve in the deaerator is the erratic fluctuating effect on the float of changes in density of the layer of liquid at the surface, due to foaming. This erratic fluctuation of the float will cause the liquid to be introduced into the deaerator in intermittent spurts.

By providing a vertically disposed float 25 of small diameter and considerable length, a considerable portion of this float will be immersed in the liquid, so that the fluctuating influence of the foam at the surface tending to cause erratic movements of the float will be reduced materially, and the float will be substantially stabilized to permit a uniform steady flow of liquid into the deaerator chamber 10. A float of about 49 inches long and about 1½ inches in diameter, and having a buoyancy which will cause over three-quarters of its length to be immersed has been found satisfactory for the purpose.

The lower end of the deaerator chamber 10 is formed with a deep depending cylindrical extension or well 27 of reduced width serving not only to accommodate the lower immersed section of the elongated float 25, but also serving by its reduced width as a guide to limit lateral swaying of said float. The depending extension or well 27 has the further important advantage that it insures ample time for all air bubbles and foam to escape from the body of liquid before the liquid is drawn off from the bottom of the deaerator.

The float 25 is desirably made of a thin gauge stainless steel tube, having its lower end hermetically sealed by a head 30 welded thereto, and having its upper end closed by a plug 31 hermetically welded to said tube and formed with a collar 32 snugly embracing the lower section of the connecting rod 26. This rod 26 may be attached to this collar 32 by soldering, and the extent to which it projects into the interior of the float tube may be varied to give the desired weight to the float and the desired distance between the float and the control sleeve 20.

The upper end of the rod 26 is secured to the sleeve 20 by a sanitary connection which permits easy separation of its parts for cleaning and brushing. For that purpose, the lower end of the sleeve 20 is formed with two slots 34 on diametrically opposite sides thereof, and the upper end of the rod 26 is formed with a cylindrical head 35 which fits snugly into the lower end of said sleeve 20, and which is formed with an annular groove 36 in registry with said slots 34. This rod head 35 is detachably retained in position in the sleeve 20 by a spring clip 38 (see Fig. 3) extending into the slots 34 and the groove 36. This spring clip 38 is U-shaped, and is formed with two pairs of spaced opposed inward projections 39 and 40. The distance between the inner faces of the two arms of the clip between the two pairs of projections 39 and 40 is substantially equal to the diameter of the groove 36 so that these clip arms prevent axial displacement of the sleeve 20 with respect to the rod 26. The two pairs of projections 39 and 40 serve as stop means to yieldably resist the removal of the spring clip 38, the end projections 39 being rounded to cam the clip arms apart as the clip 38 is forced into or out of fastening position. The bent section of the spring clip 38 projects beyond the sleeve 20, and forms a finger loop 41 by which said clip may be inserted or removed.

Just above the head 35, the sleeve 20 has a series of holes 42 which permit escape therethrough of any liquid that might leak past the plug 22, or flow down in the clearance space between the tube 13 and the sleeve 20. Thus no liquid can accumulate in the sleeve and in effect add to the weight of the movable parts.

The float control construction described has many desirable features which make it highly suitable for the purpose. It is simple and inexpensive to manufacture; it is operated by gravity, thereby making it more reliable than if it were operated by electricity, air pressure or other devices which are apt to fail in an emergency; it does not involve the cutting of a hole in the deaerator shell as in the case of other types of control, thereby eliminating a source of leakage and reducing the cost of manufacture; the float is not subject to the downward pressure of the liquid entering the intake spray pipe 13, since the fluid pressure from said pipe acting on the sleeve 20 is all horizontal and in an outward direction; the sleeve 20 is centered with respect to the intake spray pipe 13 by the horizontal outward pressure in all directions acting on said sleeve, thereby preventing binding of said sleeve and unequal slide wear of said pipe and said sleeve; it floats freely in the liquid; it is self-lubricated by the liquid; it acts to throttle the flow and does not act as an on and off valve, thereby permitting fine continuous adjustment of the flow of the liquid; due to the deep immersion of the float it avoids almost completely the effect of the rapid fluctuations in density and displacement at the surface of the liquid to which a round or flat shallow float would be subjected; and it can be easily taken apart for cleaning, since all the parts may be readily exposed for inspection and cleaning, and are free from threads.

Near the lower section of the deaerator chamber 10 is a window 43 (Fig. 1) for observation of the milk level. At its upper end, the deaerator chamber 10 is provided with a detachable cover 44 seated on the upper edge of the deaerator shell, and sealed by a gasket or in any other conventional manner to prevent any leakage of air.

In order to prevent passage of the fine particles of liquid out with the air through the connection 11 and to the evacuator 12, there is provided a horizontal baffle 45 located in the deaerator chamber 10 above the spray apertured section of the intake pipe 13 and below the connection 11 to the evacuator. This baffle 45 is seated on lugs or flanges 46 extending inwardly from the deaerator shell, so that said baffle can be easily removed for cleaning, and is in the form of a disc slightly dished to prevent the collection of liquid thereon. A central opening in the baffle 45 receives the intake spray pipe 13 and forms a drain for said baffle 45. A supplemental baffle 47 around the intake spray pipe 13 is seated on the baffle 45 over its central opening, and forms a housing with an open bottom, and an open side 48 directed away from the outlet 11 leading to the evacuator 12.

As many changes can be made in the above device, and many apparently widely different embodiments of this invention can be made without departing from the scope of the claims, it is intended that all matter contained in the above description or shown in the accompanying drawings shall be interpreted as illustrative and not in a limiting sense.

What is claimed is:

1. An apparatus for removing gaseous or readily vaporizable materials from a liquid, comprising a degasifying chamber adapted to collect a body of liquid in the lower part thereof, and having a liquid supply pipe projecting into the upper part thereof, said pipe having a plurality of spray holes distributed along the length thereof and around the circumference thereof for spraying liquid radially outwardly in a finely divided state into said chamber above the surface of such body of liquid, a sleeve encircling and slidable along said pipe, a float in said chamber connected for operating said sleeve to close off a greater or lesser number of said holes in accordance with the level of the liquid in the chamber, means for withdrawal of liquid from the lower part of the chamber at a substantial distance below the surface of said body of liquid therein, and means for maintaining a reduced pressure in said chamber and exhausting gases and vapors from the chamber at a substantial distance above the surface of the body of liquid therein.

2. In an apparatus for degasifying liquids, a degasifying chamber adapted to contain a body of liquid in the lower part thereof, and having a liquid supply pipe vertically disposed in the upper part of the chamber, said pipe being closed at its lower end and having a plurality of relatively small spray holes distributed along the length thereof and around the circumference thereof for spraying liquid outwardly in a substantially horizontal direction in said chamber and above the surface of a body of liquid therein, a sleeve vertically slidable on said pipe to cover a greater or lesser number of said holes, a float in the chamber in axial alignment with said pipe and connected to said sleeve, means for maintaining a vacuum in said chamber and withdrawing gases from the upper part of the chamber, and means for withdrawing degasified liquid from the lower portion of said chamber at a substantial distance below the surface of a body of liquid therein.

3. An apparatus for treating a liquid to vary its gaseous or readily vaporizable constituents, comprising a treating chamber having a vertically disposed liquid supply pipe projecting into the upper part thereof, said pipe having a plurality of outlets distributed along the length thereof and through which the liquid may be sprayed into said chamber, and also having an upwardly facing seat at its lower end, a valve plug resting on said seat to close said lower end and removable through the upper end of the pipe for cleaning, and a sleeve encircling and slidable along said pipe to control said outlets, and a float in said chamber and connected to the lower end of said sleeve.

4. An apparatus for treating liquid to vary its gaseous or readily vaporizable constituents, comprising a treating chamber having a well at the lower end thereof, which well is of small cross-sectional area compared to that of said chamber, said chamber being adapted to contain a body of liquid to fill the well and the lower portion of said chamber, a vertically disposed liquid supply pipe extending into the upper portion of said chamber in alignment with said well and provided with spray openings distributed circumferentially and longitudinally of said pipe for spraying liquid outwardly into said chamber above the liquid level in the latter, a sleeve encircling and slidable along said pipe to cover a greater or lesser number of said openings, and a vertically disposed float of comparatively small diameter connected to said sleeve in alignment with said pipe and having its lower portion extending into said well and held by the latter against lateral movement out of substantial alignment with said supply pipe and the sleeve slidable thereon.

5. An apparatus for treating liquid to vary its gaseous or readily vaporizable constituents, comprising a treating chamber having a well of small diameter at the lower end thereof, which well has a depth much greater than its diameter, said chamber being adapted to contain a body of liquid to fill the well and the lower part of said chamber, a liquid supply pipe extending into the upper part of said chamber and having a plurality of relatively small holes for spraying liquid outwardly above the liquid level in said chamber, valve means for controlling the inflow of liquid through said holes, means for continuously withdrawing liquid from the lower end of said well, and a float in said chamber connected to said valve means and extending into said well for maintaining the liquid level in said chamber substantially constant, the cross-sectional area of said float being only slightly smaller than the cross-sectional area of the well, whereby foaming of said liquid at said level has negligible effect upon the action of said float and said well presents substantial lateral movement of said float.

6. An apparatus for degasifying liquids, comprising a degasifying chamber, means for maintaining a reduced pressure therein, and withdrawing gases therefrom, a vertically extending liquid supply pipe in the upper part of said chamber, which pipe is closed at its lower end and has a plurality of spray openings distributed lengthwise and circumferentially thereof for delivering liquid outwardly into said chamber above the liquid level in the latter, a sleeve slidable over said pipe for closing off a variable number of said openings, a relatively long and narrow float extending vertically in said chamber and connected for operating said sleeve in accordance with the level of liquid in said chamber so as to maintain said level substantially constant, the cross-sectional area of said float at the surface level of the liquid in said chamber being only a small fraction of the cross-sectional area of said chamber at said liquid surface level, and means providing for the withdrawal of degasified liquid from the bottom of said chamber.

7. In a deaerating apparatus for a nutritive liquid, a float valve for controlling flow to said apparatus, comprising a liquid intake pipe having a series of spray holes, a sleeve valve telescoped over said pipe for controlling flow through said holes, a slender float, a rod, means connecting one end of said rod to one end of said float, and a detachable connection between the other end of said rod and one end of said sleeve, and comprising a head on said other rod end having a snug slide fit into said sleeve end, said sleeve end and said head having registering slots, and a U-shaped spring clip embracing said head and extending into said registering slots.

8. An apparatus for degasifying liquids, comprising a degasifying chamber having an elongated well depending from the bottom thereof, the cross-sectional area of which well is small relative to that of said chamber, a liquid supply pipe disposed in the upper part of said chamber and having a plurality of relatively small spray openings distributed along a portion of the length of the pipe for spraying liquid into said chamber above the liquid level in the latter, means providing for the withdrawal of liquid from the bottom of said well, a closure element associated with and movable relative to said pipe for closing off a variable number of said openings, a vertically extending elongated float connected with said closure element for controlling the supply of liquid to said chamber in accordance with the liquid level in the chamber, the upper part of said float being disposed in said chamber and the lower part of said float extending a substantial distance down into said well, and means including said float and closure element operative to maintain a substantially constant level of liquid in said chamber at a substantial distance above the top of said well.

PAUL F. SHARP.
DAVID B. HAND.
EDWARD S. GUTHRIE.

REFERENCES CITED

The following references are of record in the file of this patent:

UNITED STATES PATENTS

| Number | Name | Date |
|---|---|---|
| 1,535,721 | Gill | Apr. 28, 1925 |
| 1,598,787 | Shields et al. | Sept. 7, 1926 |
| 1,749,561 | Cadman | Mar. 4, 1930 |
| 1,522,982 | Strandt | Jan. 13, 1925 |
| 1,943,536 | Muller | Jan. 16, 1934 |
| 1,163,734 | Binns | Dec. 14, 1915 |
| 1,523,773 | Harris | Jan. 20, 1925 |
| 1,801,178 | Sim | Apr. 14, 1931 |
| 1,243,258 | Carpenter | Oct. 16, 1917 |
| 1,416,215 | Kirkup | May 16, 1922 |
| 1,880,903 | Dryer | Oct. 4, 1932 |
| 1,395,981 | Gamble | Nov. 1, 1921 |
| 1,589,224 | Rabe | June 15, 1926 |
| 1,447,445 | Thurber | Mar. 6, 1923 |
| 43,951 | Miller | Aug. 23, 1864 |
| 1,920,062 | Casani | July 25, 1933 |
| 1,041,273 | Hammond | Oct. 15, 1912 |

FOREIGN PATENTS

| Number | Country | Date |
|---|---|---|
| 297,964 | Great Britain | Oct. 4, 1938 |